United States Patent [19]
Pravaz

[11] 3,969,772
[45] July 20, 1976

[54] JUMPING GARMENT FOR A PARACHUTIST

[75] Inventor: Marcel Pravaz, Clichy, France

[73] Assignee: Etudes et Fabrications Aeronautiques, Paris, France

[22] Filed: Dec. 11, 1974

[21] Appl. No.: 531,668

[30] Foreign Application Priority Data
Dec. 19, 1973 France .................. 73.45483

[52] U.S. Cl. .................................................. 2/79
[51] Int. Cl.² ....................................... A41D 13/02
[58] Field of Search ............. 2/DIG. 1, 69, 79, 80, 2/81, 82, 2.1, 227; 244/143, 146, 142 R

[56] References Cited
UNITED STATES PATENTS

| 1,005,569 | 10/1911 | DeMeir ........................ 2/2.1 R X |
| 1,252,187 | 1/1918 | Shane ........................ 2/DIG. 1 |
| 1,783,485 | 12/1930 | Shaw ............................ 2/79 |
| 3,045,243 | 7/1962 | Lash et al. ................. 2/82 X |
| 3,113,320 | 12/1963 | Cherowbrier et al. ........ 2/81 |
| 3,296,626 | 1/1967 | Ludwikowski et al. ..... 2/DIG. 1 |
| 3,742,518 | 7/1973 | Garcia ......................... 2/79 |

FOREIGN PATENTS OR APPLICATIONS

| 1,155,985 | 12/1957 | France ...................... 2/DIG. 1 |
| 525,962 | 5/1955 | Italy |

Primary Examiner—Alfred R. Guest

[57] ABSTRACT

Jumping garment for a parachutist in which means are incorporated for increasing the drag during the free fall. The drag-increasing means comprise openings formed in the wall of the garment in at least one of the sides of the body. The openings are adapted to allow direct entry of air into the space defined by the garment around the body of the parachutist so as to fully inflate the garment.

15 Claims, 6 Drawing Figures

JUMPING GARMENT FOR A PARACHUTIST

The present invention relates to an equipment for parachutists and more particularly to garments or one-piece suits employed by sporting parachutists in jumping or sky diving competitions for effecting various evolutions under free fall conditions.

It is well known that the speed of the parachutist when falling freely is an inverse function of the increase in his drag (Cx). Therefore parachutists who wish to decrease their speed of fall (for example for effecting evolutions in free fall, regrouping etc.) desire to increase their drag.

Devices are known for increasing this drag in free fall. These devices are in the form of additional surfaces obtained by the addition of fabric to the garment, these surfaces vary in size and sometimes assume the characteristic shape of bat wings. Another means consists in making the garment too big by mounting sleeves of the raglan type of exaggerated dimensions.

A jumping garment for parachutists is also known from U.S. Pat. No. 3,742,518 and comprises flared sleeves fixed around the legs and the forearms so as to define about these parts or members annular spaces in which the air enters in the course of the fall and is trapped locally between said sleeves and the garment.

Another garment, disclosed in U.S. Pat. No. 1,005,569, comprises intercommunicating inner cells defined by two spaced-apart walls of the garment and outer air chambers which are open in their lower part and communicate with the cells by way of an aperture provided in their upper part.

Some of these devices employing additional surfaces (for example wings) are forbidden in competition by international regulations. Others are unattractive and may even constitute a hindrance to the parachutist.

An object of the present invention is to increase the drag on a garment of the one-piece type, not by the use of additional surfaces as in the known devices but by an increase in the volume of the garment.

According to the invention, there is provided a jumping garment for a parachutist comprising means for increasing the drag during the fall, wherein said means comprise openings which are formed in the wall of the garment on at least one of the sides of the body and adapted to permit penetration of air directly into the whole of the space defined about the body of the parachutist by the garment so as to fully inflate the garment.

The interest of the invention will be understood in that it is applicable to garments of conventional type having normal dimensions and shape and permits in the course of the free fall (relative wind) air to penetrate the garment by way of the openings and inflate the garment and thereby increase the drag of the parachutist. The openings are normally opened on the ground in accordance with an arrangement which is proper to each one and a function of the weight of the parachutist and of the desired rate of fall. They may also be opened in flight; in this case a control may be provided therefor employing a system of lines or halyards sliding in guides judiciously positioned on the garment.

The inflating means may be provided by employing on the side exposed to the relative wind a fabric having a very high porosity, the effect being the greater as the difference in porosity between the surface exposed to the relative wind and the leaward surface is greater.

Further features and advantages of the invention will be apparent from the ensuing description with reference to the accompanying drawings, given by way of example and in which.

Figure 1:
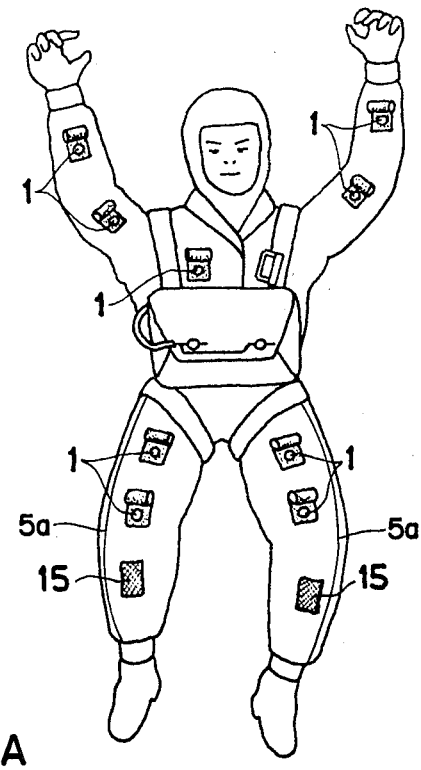
FIG. 1 is a front view of a parachutist in a spread-eagled position equipped with a jumping one-piece suit or garment of conventional type to which the invention is applied.
Figure 2:
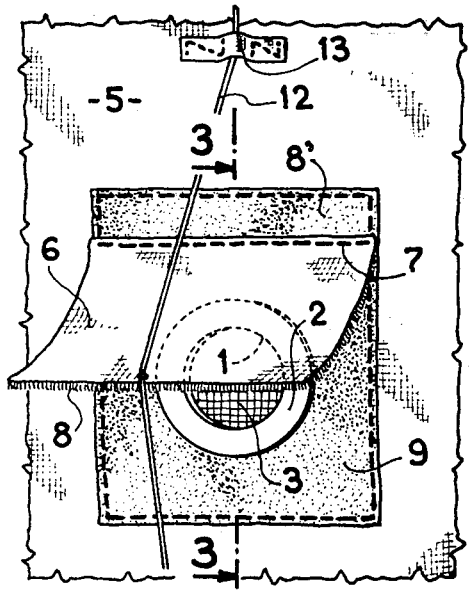
FIG. 2 is a partial view, to an enlarged scale, of one embodiment of an opening of the type shown in FIG. 1.

In the embodiment shown in FIG. 2, there are provided in the one-piece suit or garment for sky diving or jumping, which is drawn tight around the parachutist's wrists and ankles in the known manner, a certain number of openings 1 arranged on the front side of the garment, that is to say on the front of the legs and chest and on the inside of the arms which, in the normal spread-eagled position of diving, are normally exposed to the relative wind. FIG. 1 shows this spread-eagled position that the parachutist usually adopts when falling through the air in a substantially horizontal orientation.

Conveniently, these openings are simple apertures formed in the fabric of the garment in the middle of an eyelet 2 for example of metal of conventional type which is clipped or fastened through the thickness of the fabric.

In the course of free fall, the relative wind has for effect to apply the fabric of the garment flat against the body of the user.

Figure 3:
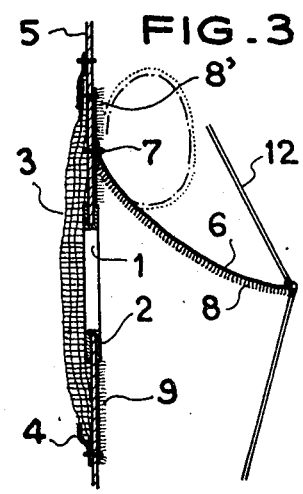
FIG. 3 is a partial sectional view taken on line 3—3 of FIG. 2.

In order to ensure that this application of the fabric flat against the body of the user does not close or mask the centre aperture of the eyelet 2 by applying the latter against the subjacent clothing and thereby prevent the air from penetrating the one-piece garment, there is provided on the inner side of the fabric an arrangement shown in FIG. 3 which has for effect to maintain the eyelet spaced away from the surface of the subjacent clothing.

This arrangement comprises an element 3 constituted by a piece of netting formed, for example, from plastics filaments which are interlaced in a plurality of thicknesses, this element extending over an area exceeding the area of the opening 1.

The element 3 is maintained on its periphery, for example by means of a tape 4 of fabric which is sewn, or otherwise secured, in position on the fabric 5 of the garment and on the element 3.

The element 3 forms a certain thickness which ensures the passage of air and allows the latter to penetrate the garment even if it is strongly applied against the body of the user.

Preferably, the opening 1 may be closed by a flexible foldable flap 6 for example of fabric.

The flap 6 is for example rectangular in shape and is sewn on the garment 5 along one of its edges, as shown at 7 (FIGS. 2 and 3).

This flap 6 may be maintained in the closing position by means of mutual gripping elements 8, 9 having loops and hooks of the commercially-available type known under the Trade Mark "Velcro" which are fixed respectively to the inner face of the flap 6 around the eyelet 2 and to the fabric 5 of the garment.

The flap 6 may also be maintained in its opening position (shown in dot-dash line in FIG. 3) by a hooking element 8' provided above the fixing 7 of the flap.

Before jumping or in the course of the fall, the parachutist opens the openings 1 by raising and turning back the flaps 6 upwardly engaging them with the hooking elements 8'.

The air then enters the garment by way of the openings 1 and inflates it and thereby increases its volume and consequently the drag of the parachutist in the air and slows down the rate of fall.

Figure 4:
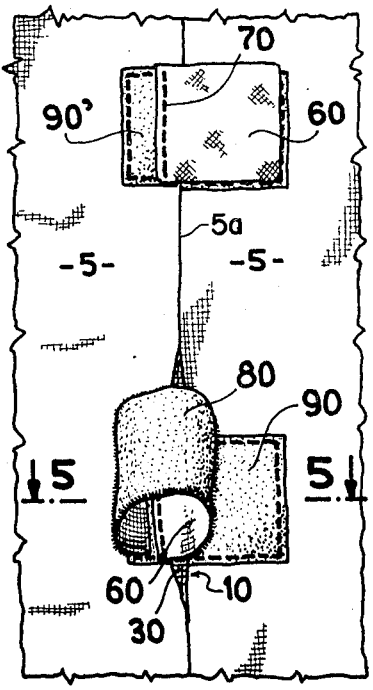
FIG. 4 is a partial view of another embodiment of the invention.
Figure 5A:
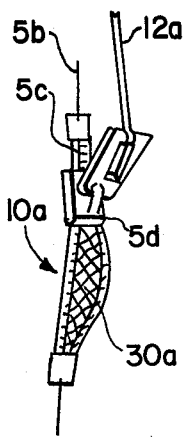
FIG. 5A is a partial view of a further embodiment of a seam opening.
Figure 5:
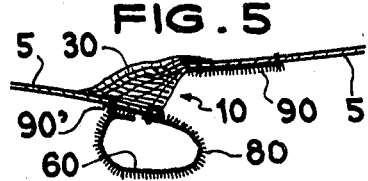
FIG. 5 is a sectional view taken on line 5—5 of FIG. 4.

FIGS. 4 and 5 show a modification of the invention in which the openings 10 are arranged in a different way.

In this embodiment, stitching seams 5a of the garment, for example the stitching seams 5a on the side of the legs (or others) are interrupted in a plurality of places where the edges of the fabric 5 are interconnected by an element 30 similar to the element 3.

In the embodiment shown in FIGS. 4 and 5, a flap 60, having a width at least equal to the width of the opening 10 defined by the interruption of the stitching seam, is sewn at 70 to the part of the fabric 5 which covers the other and also includes on its inner surface a hooking element 80 of the "Velcro" type which may cooperate, in the position for closing the opening 10, with a complementary hooking element 90 fixed to the other edge of the fabric 5 and, in the position for opening, with a hooking element 90' in the manner of the first embodiment.

It will be understood that the parachutist may open selectively any number of openings either before jumping, or during the fall, in order to act on the degree and rate of inflation of the garment in accordance with his weight and/or the drag he desires, to control the rate of fall.

If desired, means may be provided for opening all the openings simultaneously.

These means may be constituted by a pull line 12 which extends, for example, alongside each leg (FIG. 2) and is fixed to the end of each flap 6 and maintained on the garment by loops 13 in which it is slidable.

The end of each line may have a tab (not shown) provided with a hooking element of the "Velcro" type which may be fixed to a complementary element secured to the garment so as to maintain the line taut after the flap 6 has been raised.

Sliding fasteners may also be employed for closing the air entry openings in the garment. An illustration of such an arrangement is shown in FIG. 5A in which seam 5b is interrupted to form an air inlet opening 10a which can be opened or closed by a sliding fastener 5c, 5d whose slide 5d can be shifted by a line 12a if the opening of the seam is to be remote-controlled. An element 30a similar to element 30 is provided at the back of the seam to facilitate the widening of the opening 10a and allow air to enter when the sliding fastener 5c, 5d has opened the opening 10.

Note that in one embodiment of elementary simplicity, there may be provided in the course of the fabrication of the garment strips or other areas of any form of a fabric having high porosity which allows the air to penetrate the one-piece garment. Preferably these porous areas have on the inner surface of the garment an element, such as the element 3, 30, which ensures that the air can enter the garment.

The latter embodiment has been shown only in a limited manner at 15 in FIG. 1 since its simplicity requires no additional explanatory detail.

Having now described my invention what I claim as new and desire to secure by Letters Patent is:

1. In a sky diving garment having sleeves and legs for a parachutist and defining a flexible wall exposed to the air about at least a part of the body including the arms and legs of the parachutist; the improvement comprising means for inflating the garment and thereby increasing the drag during the diving, said means comprising air entry openings which are in regions of the garment wall including a region of each sleeve and a region of each leg of the garment and defined by the wall of the garment and facing away from the parachutist/transversely of the parachutist to permit entry of air directly into a space defined about the body of the parachutist by the wall of the garment so as to inflate the garment as the parachutist falls through the air in a substantially horizontal orientation.

2. A garment as claimed in claim 1, wherein said openings are disposed on a lower side of the garment when the garment is worn by the parachutist in a spread-eagled horizontal position.

3. A garment as claimed in claim 2, wherein the openings are constituted by apertures and a reinforcement on a peripheral edge portion of the apertures.

4. A garment as claimed in claim 3, wherein the reinforcement is constituted by an eyelet defining the apertures.

5. A garment as claimed in claim 2, wherein the garment has seams and the openings are constituted by interruptions in the seams of the garment.

6. A garment as claimed in claim 5, comprising sliding fastener means for selectively opening and closing said openings.

7. A garment as claimed in claim 6, comprising lines secured to slides of the sliding fastener means for remotely controlling the sliding fastener means.

8. A garment as claimed in claim 2, wherein said openings are formed by a porosity of the wall of said lower side of the garment which is greater than the porosity of the wall of the upper side of the garment.

9. A garment as claimed in claim 2, wherein said openings are constituted by portions of the wall of the garment which have a greater porosity than in the remainder of the garment.

10. A garment as claimed in claim 9, wherein said portions of the wall are portions which have been mounted on the remainder of the garment.

11. A garment as claimed in claim 1, comprising movable flaps combined with the openings for selectively closing and opening the openings.

12. A garment as claimed in claim 1, comprising an element having high porosity and constituting a spacer member located on the inner side of the wall of the garment in the region of each of said openings for spacing the wall of the garment away from the body of the parachutist in the region of said openings and thereby facilitating entry of air into the garment when the garment tends to be applied flat against the body of the parachutist.

13. In a sky diving garment for a parachutist and defining a flexible wall about at least a part of the body of the parachutist; the improvement comprising means for inflating the garment and thereby increasing the drag during the diving, said means comprising openings defined by the wall of the garment in at least a part of the garment corresponding to one of the sides of the body of the parachutist to permit entry of air directly into a space defined about the body of the parachutist by the wall of the garment so as to inflate the garment as the parachutist falls through the air, movable flaps combined with said openings for selectively closing and opening said openings, and means for retaining said flaps in the opening and closing positions of the flaps.

14. A garment as claimed in claim 13, wherein said retaining means are constituted by interhooking strips of the "Velcro" type.

15. In a sky diving garment for a parachutist and defining a flexible wall about at least a part of the body of the parachutist; the improvement comprising means for inflating the garment and thereby increasing the drag during the diving, said means comprising openings defined by the wall of the garment in at least a part of the garment corresponding to one of the sides of the body of the parachutist to permit entry of air directly into a space defined about the body of the parachutist by the wall of the garment so as to inflate the garment as the parachutist falls through the air, movable flaps combined with said openings for selectively closing and opening said openings and means for retaining the flaps in the opening and closing positions of the flaps, and lines and loops on the garment through which loops said lines are guided, said lines being secured to said flaps for remotely raising by traction the flaps to their position for opening the openings.

* * * * *